(12) United States Patent
Allen

(10) Patent No.: US 6,489,717 B1
(45) Date of Patent: Dec. 3, 2002

(54) CHANNELED GLASS ARTICLE AND METHOD THEREFOR

(75) Inventor: Stephen R. Allen, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/623,767
(22) PCT Filed: Feb. 8, 1999
(86) PCT No.: PCT/US99/02532
§ 371 (c)(1), (2), (4) Date: Sep. 5, 2000
(87) PCT Pub. No.: WO99/45557
PCT Pub. Date: Sep. 10, 1999

Related U.S. Application Data

(60) Provisional application No. 60/076,968, filed on Mar. 5, 1998.

(51) Int. Cl.[7] .................. C03B 9/12; C03B 9/193; H01J 61/30
(52) U.S. Cl. ................. 313/493; 65/34; 65/36; 65/54; 65/93; 65/107
(58) Field of Search ............... 65/66, 67, 34, 65/36, 44, 53, 54, 55, 93, 106, 107, 110; 313/493, 483, 484, 485

(56) References Cited

U.S. PATENT DOCUMENTS

| 3,528,791 A | 9/1970 | Giffen |
| 4,361,429 A | 11/1982 | Anderson et al. |
| 4,584,501 A | 4/1986 | Cocks et al. |
| 4,605,429 A | 8/1986 | Rajnir |
| 4,990,826 A | 2/1991 | Cocks et al. |
| 5,036,243 A | 7/1991 | Cocks et al. |
| 5,276,378 A | 1/1994 | Gothard ............... 313/491 |
| 5,463,274 A | 10/1995 | Winsor ............... 313/493 |
| 5,466,990 A | 11/1995 | Winsor ............... 315/56 |
| 5,592,047 A | 1/1997 | Park et al. ............... 313/484 |
| 5,632,764 A | 5/1997 | Chang et al. |
| 5,834,888 A | * 11/1998 | Allen et al. ............... 313/484 |
| 5,858,046 A | 1/1999 | Allen et al. |

* cited by examiner

Primary Examiner—Nimeshkumar D. Patel
Assistant Examiner—Thelma Sheree Clove
(74) Attorney, Agent, or Firm—Siwen Chen

(57) ABSTRACT

The method herein shapes a thin glass article (10), as well as a thin glass interface (20, 22) between two laminated sheets (16, 18) as they seal together to form the glass article (10). This process changes the shape of the article (10) and modifies the internal interface (20, 22) at the juncture where the glass sheets (16, 18) meet to make the channels (12). As a result, the juncture is very thin and very little or no slope. The process uses the mechanical motion of a plunger combined with plunger vacuum and internal gas pressure to make these changes. The technique reduces the contact area between glass layers (16, 18). A reduced contact area can reduce the optical interference caused by the joining of two layers of glass (16, 18). The technique also makes the front surface of each channel (12) thinner. The glass thinness also allows for thinner products with substantially reduced light distortion at the juncture.

21 Claims, 4 Drawing Sheets

CHANNELED GLASS ARTICLE AND METHOD THEREFOR

This application claims benefit of provisional application No. 60/076,968 filed Mar. 5, 1998.

TECHNICAL FIELD

This invention relates to channeled glass articles such as neon lighting devices. This invention also relates to a stretched seal forming process for making the glass articles.

BACKGROUND OF THE INVENTION

Neon lighting devices are disclosed in U.S. Pat. No. 4,584,501 (Cocks et al.), U.S. Pat. No. 4,990,826 (Cocks et al.), U.S. Pat. No. 5,036,243 (Cocks et al.). Generally, these patents disclose multifaceted lighting devices comprising glass or other vitreous plates which are hermetically sealed together to form a device with internally enclosed channels. These channels are thereafter evacuated and backfilled with an inert gas such as neon and thereafter ionized through the provision of a series of electrodes.

Generally, the method for forming the glass component of these prior art neon lighting devices involves cutting channels in a bottom glass plate followed by hermetically sealing, via the use of a glass frit, a glass top plate to this channeled glass bottom plate. Various methods are used to cut the channels into the bottom glass plate including grinding, etching and sand blasting through an adhesive rubberized mask exhibiting a pattern identical in shape to the desired channel pattern.

Recently, the improved method for forming glass bodies for use as discharge fighting devices has been disclosed in U.S. patent application Ser. No. 08/634,485 (Allen et al.); co-assigned to the instant assignee, and herein incorporated by reference. Briefly, this method, involves two, separately delivered and deposited, molten glass ribbons, i.e., a sealing ribbon laid over the top of the already deposited channel-forming ribbon. For very thin products/thin ribbons, the difficulty with this method is that in order to maintain a time-efficient process, the rollers must be spaced very close together and run a very high speed; e.g. rollers spaced 12 in. apart and moved at a speed of about 17"/sec.

Still another improved method for forming glass bodies for use as discharge lighting devices has been disclosed in U.S. patent application Ser. No. 08/851,320 (Allen et al.); co-assigned to the instant assignee, and herein incorporated by reference. Briefly, upon exiting the rollers, first length of the molten glass ribbon is deposited upon the mold which is moved along a predetermined path, preferably a direction along the mold's width; although the molten ribbon could be deposited in a direction along the mold's length.

Following the conformance of the first length to the mold cavity, through either gravity or vacuum forming or a combination of the two, the mold is thereafter moved back along a second predetermined path opposite the first direction. In other words, second length of the molten glass ribbon is essentially folded over and onto first length of the molten glass ribbon.

As improved as these glass articles and methods are, the demands of the market place require improved glass articles and method for producing them. Certain lighting businesses require as little optical interference as possible. Phosphor costing do not like areas that will settle out the phosphor and create dark spots on the lamp. These glass articles are useful in vacuum tubes, incandescent lamps, fluorescent lamps, CRT's, vehicle lighting and the like.

DISCLOSURE OF THE INVENTION

I have developed a method of shaping thin glass articles. As a result, the glass article has thin walls, as well as a thin glass interface between the two laminated sheets. When a layer of molten glass is applied to a mold and a second layer of glass is applied, channels are created between the glass layers. My process changes the shape of the article and modifies the internal interface at the juncture where the glass sheets separate to make channels. I use the mechanical motion of the plunger combined with plunger vacuum and internal gas pressure to make these changes. By reducing the plunger dwell time, a glass seal can be made and retain sufficient heat for the glass to be flexible. This results in a glass article, wherein the second layer of glass is thin and the juncture between layers is thin. I then utilize the glass flexibility by retracting the plunger slowly and pulling the two glass layers away from each other at the junction. This motion stretches the glass interface and straightens the glass interface surface.

Dwell time as used herein is a combination of an initial contact time and a subsequent forming time. As soon as the plunger touches the glass layers, it immediately pulls back from the junction and holds its position away from the junction. The initial contact time is less than one second and as close to zero as possible. The pull back or forming time may be as long as 2 to 3 seconds.

The stretched seal produces a stronger mechanical seal and consequently a stronger product. Another benefit of this process occurs when applying a phosphor coating. The thin interface of this invention essentially has no shape or slope. The normal "u" or "v" shaped interface of the prior art glass leaves a thick area of phosphor in the recess. See prior art FIG. 3. When the lamp is lit, the thick area of phosphor will be darker than the remaining lamp areas. When the seal is stretched with this process, the problem is eliminated. Another use of the technique is to reduce the contact area between glass layers. A reduced contact area can reduce the optical interference caused by the joining of two layers of glass. If the contact area between the sheets of glass can be reduced or minimized, the optics can be improved for products requiring uniform light distribution.

This invention eliminates the "u" or "v" shaped interface of the prior art.

In one embodiment, the glass articles of this invention have a gentle shoulder at the interface. In another embodiment, the glass articles of this invention have virtually no shoulder at the interface. In this embodiment, the interface is nothing more than slight slope. See FIG. 2A.

The most significant value of this invention is for the fluorescent light business. The phosphor coatings do not like areas that will settle out the phosphor and create dark spots in the lamps. The glass thickness can also be reduced to make thinner products of complex geometry. The back lighting businesses require as little optical interference as possible in the lens area. With this process, we can build thin unobtrusive support structures within a lamp and minimize the optical interference.

BEST MODE OF CARRYING OUT INVENTION

Figure 1:
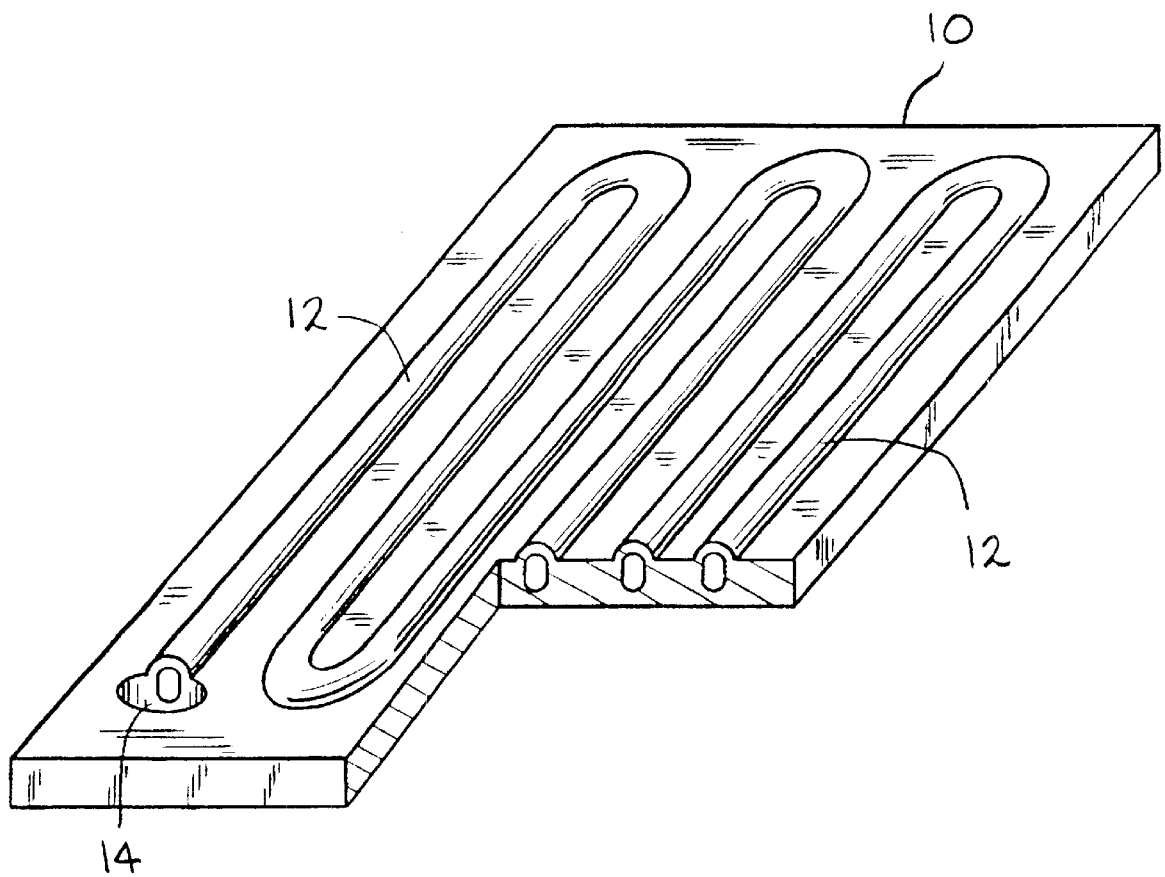
FIG. 1 is a perspective and cutout view illustrating an embodiment of a glass article which is capable of being produced by this forming method.

FIG. 1 illustrates a typical embodiment of a glass article 10 capable of being produced using the forming method disclosed herein. Glass article 10 exhibits at least one internal or enclosed channel 12, i.e. a glass envelope. Channel 12 possesses tubulation ports 14 located at the opposite ends of the channel, each communicating with the external environment. The tubulation ports are the future sites where the channel of the glass article is evacuated and thereafter backfilled with neon or other inert gas. Additionally, glass article may possess a plurality of internal channels of a predetermined pattern each possessing at least a pair tubulation ports located at the opposite ends of each respective channel.

Figure 2:
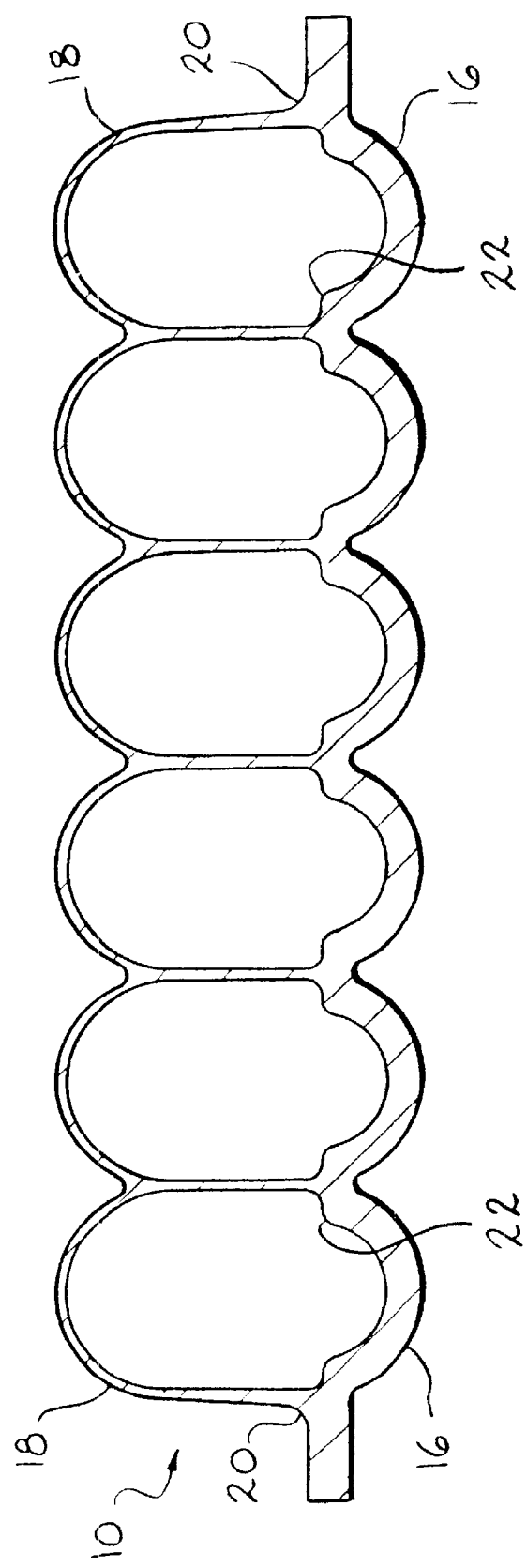
FIG. 2 shows the stretched seal forming glass articles of this invention.

FIG. 2 is a cross-sectional view of glass article 10 like that depicted in FIG. 1. Ribbon 16 typically has a thickness ranging from 0.060" to 0.080". Stretched ribbon 18 has a thickness of less than 0.060". Preferably, the thickness of ribbon 18 can be as low as 0.020". In theory, ribbon 18 may have a thickness as low as 0.001", but the practical limitations of the forming apparatus and manufacturing processes dictate a thinness of at least 0.005". Aside from the thinness of ribbon 18, FIG. 2 also shows the gentle shoulder of interfaces 20 and 22.

A key to this invention is the thinness of interfaces 20 and 22 where ribbon 16 and 18 meet. The stretch seal or interface 20 produces a stronger mechanical seal and consequently a stronger product. Another benefit of this process occurs when applying a phosphor coating. The normal prior art "u" or "v" shaped interface 22 of the glass leaves a thick area of phosphor in the recess. When the lamp is lit, the thick area of phosphor will be darker than the remaining lamp areas. When the seal is stretched with is process, the problem is eliminated. Another use of the technique is to reduce the contact area of interface 22 between glass layers. A reduced contact area can reduce the optical interference caused by the joining of two layers of glass. If the contact area between the sheets of glass can be reduced or minimized, the optics can be improved for products requiring uniform light distribution.

Figure 2A:
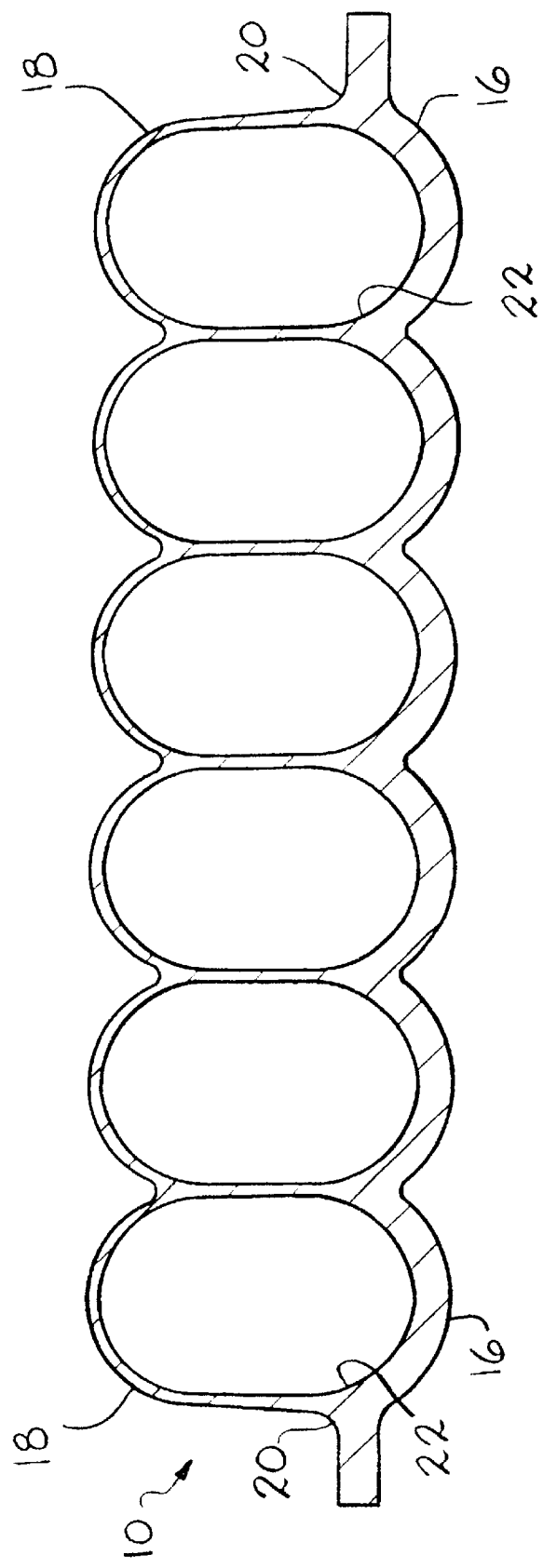
FIG. 2A shows virtually no slope at the interface.

FIG. 2A is the same as FIG. 2 except that the gentle shoulder of interface 22 is shown as a slight slope with virtually no shape. Interface 22 virtually has no dimension to its shape.

Figure 3:
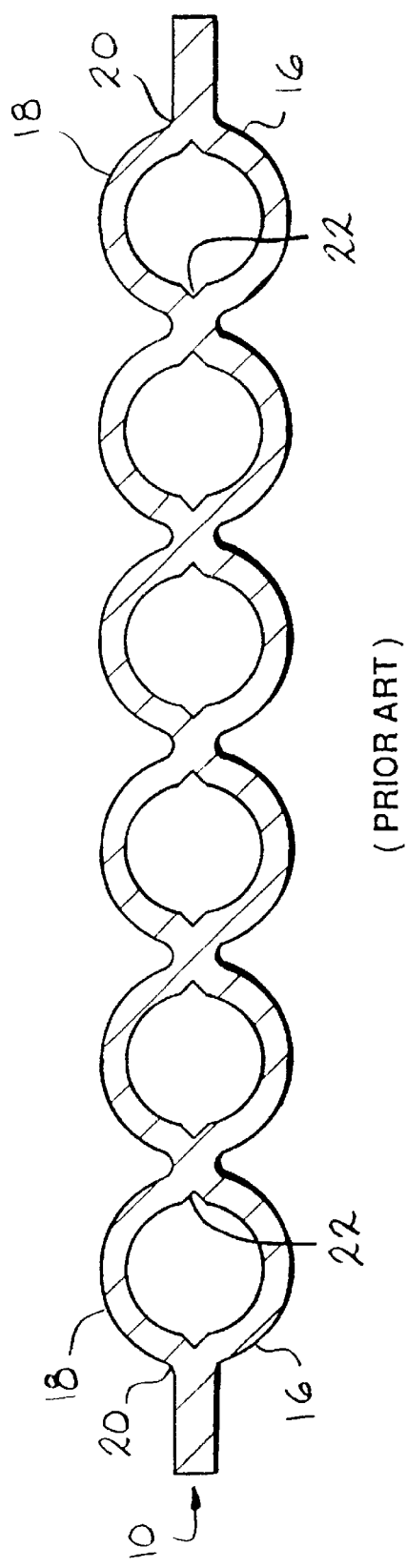
FIG. 3 shows prior art glass articles with conventional thicknesses and a conventional "v" shaped interface.

FIG. 3 is a cross-sectional view of a prior art glass article 10. Here both ribbon 16 and 18 of article 10 have a typical thickness of 0.060" to 0.080". Prior art interfaces 20 shown at conventional thickness and prior art interface 22 is shown as a "v" shape.

An apparatus for forming glass articles containing internal enclosed channels, i.e. or glass envelopes utilizing the method disclosed herein is similar to that disclosed in U.S. Pat. No. 4,361,429 (Anderson et al.) which is hereby incorporated by reference. The method comprises the steps of (a) delivering and depositing a first or channel-forming ribbon of molten glass to a surface of a mold having at least one channel-forming groove formed there within and a peripheral surface area, wherein the channel-forming ribbon overlies the mold cavity area and the peripheral surface areas of the mold; (b) causing the channel-forming ribbon of molten glass to substantially conform to the contour of the mold cavity resulting in the formation of at least one channel in the ribbon of the molten glass deposited; (c) delivering and depositing a second or sealing ribbon of molten glass to the outer surface of the channel-forming ribbon of molten glass, wherein the viscosity of the sealing ribbon is such that the sealing ribbon (i) bridges but does not sag into complete contact with the surface of the channel of the channel-forming ribbon and (ii) forms a hermetic seal wherever the sealing ribbon contacts the channel-forming ribbon, thereby resulting in a glass article possessing at least one enclosed channel; and (d) removing the glass envelope from the mold.

The method also involves the additional step of applying a vacuum to the under surface of first ribbon. As soon as the complete mold area is covered by first length of the molten glass ribbon, a vacuum is applied between the mold and first length via a vacuum line. A vacuum source communicates with a series of vacuum-vent holes which are routed through the mold body itself from and open at several locations on the glass surface of the mold, at the bottom of channel-forming grooves. A vacuum may be applied immediately after the first length of the molten glass ribbon is deposited, or such vacuum may be applied immediately after the first length has initially sagged partially within the mold cavity channel forming groove. When the vacuum is applied between the glass and mold, the glass is forced to be in immediate and intimate contact with the mold, allowing the glass to be formed to the desired shape, while also initiating the cooling and hardening of first length of the molten glass ribbon.

Following the conformance of the first length to the mold cavity, through either gravity or vacuum forming or a combination of the two, the mold is thereafter moved back along a second predetermined path opposite the first direction. As earlier, the stream of molten glass continues to be delivered from the glass orifice and thereafter to the water-cooled rollers which are rotating in opposite directions with respect to each other. These rollers thereafter squeeze the molten glass into a continuous ribbon shape, i.e., second length of the molten glass ribbon which is deposited upon and overlies the exposed surface of the first length of the molten glass ribbon. The second length of the molten glass ribbon simply lies on the first length bridging itself across the formed channels due to the relatively high viscosity of the molten glass ribbon. In other words, second length of the molten glass ribbon is essentially folded over and onto first length of the molten glass ribbon.

The bulk viscosity, at delivery, of the molten glass of the first and second ribbon lengths should be such that the following is achieved: (1) the second length of the molten glass ribbon bridges, but does not sag into complete contact with, the channel portion of the previously deposited first length of molten glass ribbon and (2) a hermetic seal is formed wherever the first and second lengths of the molten glass ribbon contact; via inherent flow viscosity characteristics of the particular glass. Preferably, the molten glass, at delivery, exhibits a bulk viscosity, of between about 1000–5000 poise. Unlike the earlier described two-ribbon technique however, there is no need to deliver the first length of the molten glass ribbon at a slightly lower initial bulk viscosity than the second length, as there is no need to compensate for the working time prior to delivery of the second length.

I use a plunger such as the glass pressing plunger in U.S. Pat. No. 5,632,794 which is hereby incorporated by reference. Care should be taken to press the second molten glass ribbon length into position only at interface 20 between the channels.

The "deep draw" pockets are in communication with an air line/orifice and at least a partial vacuum is maintained during deposition of the first length of molten glass ribbon resulting in the glass in the cavity remaining open, i.e., the glass deposited and pulled into the "deep draw" pocket ruptures rather than seal upon cooling. After deposition of the second length of the molten glass ribbon, air is blown into and through the air line/orifice and into contact with the interior of the glass article. This air aids in preventing the second length from significantly sagging or collapsing completely or partially down into the channel of the first length of the molten glass ribbon. The key is using air pressures and plunger dwell times that stretch ribbon 18 and interfaces 20 and 22. The air pressures and dwell times I use are not critical. What is critical is controlling these process conditions to achieve the thin, smooth interfaces of this invention. For example, air pressure can range from 0.01 to 50 psi. If the flow rate is too fast, the glass article breaks and no channel forms. If the flow rate is too slow, the channel never forms. Dwell times can range up to 10 seconds, and typically up to 2 to 3 seconds. Again, the key is having a very short initial contact time followed by plunger pull back which allows the channel to form. The process is a balance between air flow rates, air pressure, dwell times, line speed, glass softening temperature and the like. One needs to tailor these conditions for a given glass composition.

The glass envelopes disclosed hereinabove are preferably comprised of a transparent glass material, preferably a hard glass exhibiting excellent thermal expansion characteristics selected from the group consisting of soda-lime silicate, borosilicate, aluminosilicate, boro-aluminosilicate and the like. For example, glass envelopes have been produced from Coming Code 7251 glass which consists essentially of the following composition, expressed in terms of weight percent on the oxide: 77.4% $SiO_2$, 5.3% $Na_2O$, 15.4% $B_2O_3$, 1.9% $Al_2O_3$, 0.48 Cl.

Upon completion of the molding operation, it becomes necessary to trim the excess glass from the periphery of the glass article and thereafter remove the glass article. A suitable trimming operation is one which, not only severs the product, supported by the mold, from the excess hot glass surrounding the periphery of the mold, but which results in a positive seal to the outside edges of both glass layers. Two suitable conventional trimming operations, one "male" and one "female" are disclosed respectively in U.S. Pat. No. 4,605,429 (Rajnik) and 3,528,791 (Giffen); both of which are hereby incorporated by reference. Furthermore, an abrasive water-jet, which removes material by a lapping-type action, or a laser-cutting technique may be utilized in the trimming operation.

Although the now preferred embodiments of the invention have been set forth, it will be apparent to those skilled in the art that various changes and modifications may be made thereto without departing from the spirit and scope of the invention as set forth in the following claims.

I claim:

1. A method for forming internally channeled light emitting display envelope comprising the steps of:
    (a) delivering and depositing a first or channel-forming ribbon of molten glass to a surface of a mold assembly having a mold cavity possessing at least one channel-forming groove formed therewith and a peripheral surface, wherein the channel-forming ribbon overlies the mold cavity and the peripheral surface of the mold assembly;
    (b) causing the channel-forming ribbon to molten glass to substantially conform to the contour of the mold cavity resulting in the information of at least one channel in the ribbon of the molten glass;
    (c) delivering and depositing a second or sealing ribbon of molten glass to the outer surface of the channel-forming ribbon of molten glass wherein the viscosity of the sealing ribbon is such that the sealing ribbon (i) bridges but does not sag into complete contact with the surface of at least one channel of the channel-forming ribbon and (ii) forms a hermetic seal wherever the seal ribbon contacts the channel-forming ribbon to form a glass article with at last one enclosed channel;
    (d) causing the sealing ribbon to stretch such that the sealing ribbon has a thin cross-section and so that the hermetic seal between the sealing ribbon and the channel ribbon has a thin cross-section having a thickness of less than 0.060"; and
    (e) removing the glass article from the mold.

2. A method according to claim 1 including the steps of causing the thin, cross-section of the hermetic seal to have a gentle slope.

3. A method according to claim 1 including the step of causing the thin, cross-section of the hermetic seal to have essentially no slope.

4. A method according to claim 1, wherein step (d) is carried out by pressing the sealing ribbon into position using a plunger apparatus, whereby the sealing ribbon bridges but is not pressed into complete contact with the channel forming ribbon and blowing air into the enclosed channel between the channel-forming ribbon and sealing ribbon, thereby force the sealing ribbon into contact with the plunger.

5. A method according to claim 4 wherein the plunger only contacts the sealing ribbon at the hermetic seal.

6. A method according to claim 4 wherein the steps of blowing air is carried out at an air pressure ranging from 0.01 psi to 50 psi.

7. A method according to claim 6 wherein the air pressure ranges from 0.01 psi to 30 psi.

8. A method according to claim 4 wherein the plunger has a dwell time ranging from 0.01 seconds to 10 seconds.

9. A method according to claim 8 wherein the dwell time of the plunger includes an initial contact time of less than one second followed by a plunger pull back and hold time of up to 3 seconds.

10. An internally channeled light emitting device comprising a thin glass envelope having a front surface and a back surface laminated and integrated together to form a unitary envelope body essentially free of any sealing materials and having at least one gas discharge channel, the glass envelope exhibiting a weight to area ratio of 1.0 $g/cm^2$, each channel provided with a discharge or ionizable gas and at least two electrodes in communication with, and located at opposite ends of, the gas discharge channel for generating an arc discharge therebetween, wherein the channel has a front surface having a thin cross-section and wherein the glass envelope has an interface with a thin cross-section wherein the front surface and back surface of the envelope are laminated and integrated together, wherein the thin cross-sections have a thickness of less than 0.060".

11. The light emitting device of claim 10 wherein the thin cross-sections have a thickness ranging from 0.005" to 0.060".

12. The light emitting device of claim 10 wherein the thin cross-sections have a thickness ranging from 0.020" to 0.060".

13. The light emitting device of claim 10 wherein the interface between the front surface and back surface of the thin glass envelop has a thin, reduced contact area.

14. The improved light emitting device of claim 13 wherein the thin contact area has a gentle slope.

15. The improved light emitting device of claim 13 wherein the thin contact area essentially has no slope.

16. The light emitting device of claim 10 wherein the thin contact area essentially has no u- or v- shape.

17. The light emitting device of claim 10 wherein a portion of a back side of the back surface is provided with an integral reflecting means.

18. The internally channeled light emitting device of claim 10 wherein the glass material is selected from the group of glasses consisting of borosilicate, aluminosilicate, boro-aluminosilicate and soda-lime silicate.

19. The internally channeled light emitting device of claim 10 wherein the discharge gas is selected from the group consisting of mercury, xenon, krypton, argon, neon, helium and mixtures thereof.

20. The method according to claim 1, wherein in step (d), the sealing ribbon is caused to stretch such that the cross-section of the hermetic seal between the sealing ribbon and the channel ribbon has a thickness ranging from 0.005" to 0.060".

21. The method according to claim 1, wherein in step (d), the sealing ribbon is caused to stretch such that the cross-section of the hermetic seal between the sealing ribbon and the channel ribbon has a thickness ranging from 0.020" to 0.060".

* * * * *